United States Patent [19]
Sahashi

[11] Patent Number: 5,253,548
[45] Date of Patent: Oct. 19, 1993

[54] VEHICLE TRANSMISSION INCORPORATING MULTI-STAGE TORQUE CONVERTER

[75] Inventor: Masayoshi Sahashi, Neyagawa, Japan

[73] Assignee: Daikin Clutch Corporation, Osaka, Japan

[21] Appl. No.: 929,781

[22] Filed: Aug. 13, 1992

[30] Foreign Application Priority Data

Aug. 14, 1991 [JP] Japan .................. 3-064416[U]

[51] Int. Cl.⁵ ............... F16H 47/10; F16H 47/07; F16H 47/00
[52] U.S. Cl. .................. 74/718; 74/730.1; 74/745; 475/39; 475/41; 475/44
[58] Field of Search ............ 74/718, 730.1, 745; 475/39, 41, 44

[56] References Cited

U.S. PATENT DOCUMENTS

| | | | |
|---|---|---|---|
| 3,313,179 | 4/1967 | Flinn | 475/39 |
| 3,442,346 | 5/1969 | Winter et al. | 74/745 X |
| 4,662,243 | 5/1987 | Kawai et al. | 74/718 |
| 4,779,488 | 10/1988 | Takano et al. | 74/745 |
| 4,813,300 | 3/1989 | Ohkubo | 74/718 |
| 4,836,049 | 6/1989 | Moan | 74/718 X |
| 4,973,288 | 11/1990 | Sakakibara et al. | 474/28 X |

FOREIGN PATENT DOCUMENTS

| | | | |
|---|---|---|---|
| 1-52534 | 2/1989 | Japan | 74/730.1 |
| 2-154848 | 6/1990 | Japan | 474/43 |

Primary Examiner—Leslie A. Braun
Assistant Examiner—David E. Henn
Attorney, Agent, or Firm—Knobbe, Martens, Olson & Bear

[57] ABSTRACT

A motor vehicle torque transmission apparatus incorporating a multi-stage torque converter, a main reduction gear and a stepless speed-change transmission. The multi-stage torque converter comprises separate stators. The main reduction gear is connectable to an output section of the multi-stage torque converter. Connected to one of the stators and to the main reduction gear is a stepless speed-change transmission therebetween, such that output torque of the stator is added to output torque of the main reduction gear.

9 Claims, 5 Drawing Sheets

VEHICLE TRANSMISSION INCORPORATING MULTI-STAGE TORQUE CONVERTER

BACKGROUND OF THE INVENTION

The present invention relates generally to a torque transmission apparatus, and particularly to a motor vehicle torque transmission apparatus incorporating a multi-stage torque converter.

One application of torque converters is in the speed-changing power transmission of heavy duty vehicles. Generally, a torque converter comprises an impeller, a turbine and a stator. A means of providing multi-stage torque conversion through a converter having separate stators has been advanced recently. Such a multi-stage torque converter is capable of generating high-ratio stall torque.

FIG. 5 shows a conventional torque transmission apparatus including a multi-stage torque converter. The multi-stage torque converter comprises an impeller 1 connectable to an engine, a turbine 2, a first stator 3a and a second stator 3b. The turbine 2 is connected to a turbine shaft 4, and the first stator 3a is connected to a stationary shaft 6 through a one-way clutch 5. The turbine shaft 4 and the stationary shaft 6 are connected with each other through a transmission having gears 7, 8, 9, 10, and 11. The structure is such that the rotational direction of the turbine 2 is opposite to that of the first stator 3a.

FIG. 6 shows the r.p.m. versus output torque characteristics of the torque transmission apparatus having a conventional multi-stage torque converter. The response curve illustrates that high output torque is generated in the low r.p.m. range. Under these characteristics, when the r.p.m. reach a point N, the first stator 3a begins to rotate. In the range of r.p.m. above point N, the output torque characteristics are the same as for a conventional three-element torque converter which has a non-partitioned stator.

Heavy duty vehicles can entail higher-output torque requirements. The output torque in the low r.p.m. range can be increased wherein a high reduction ratio is established, as shown by a dashed line in FIG. 6; however, in consequence, the torque-drop occurring in mid-range r.p.m. (as indicated within the circled portion A in FIG. 6) is "steeper.". Moreover, to establish a higher reduction ratio in this way would mean using larger-diameter gears, increasing the overall apparatus size. This limits the extent to which the output torque can be increased in the conventional apparatus.

U.S. Pat. No. 4,924,978 discloses a power transmission having a reduction-gear apparatus coupled to a first stator of a multi-stage torque converter. Because the transmission has three speeds there is consequently less torque-drop in mid-range r.p.m. However, shocks occur at speed-changing stages in the transmission, wherein the output torque response is stepped. In heavy-duty vehicles in particular, such jolts can be severe.

It is possible to reduce the shock at the speed-changing stages by utilizing a stepless speed-change power transmission, as disclosed in U.S. Pat. No. 4,843,908. Engine power is transmitted therein to an output shaft through a belt and pulleys, which undergo high-torque loads. Belt type transmissions, however, are of limited strength, and are not suitable for use as the speed-change power transmission in heavy duty vehicles occasioning high-torque transmission demands.

A further consideration of relevance is that the torque converter/automatic transmission systems with which passenger cars are furnished are of very complicated structure, and jolting at transmission speed-changing therein has not proven easy to prevent.

SUMMARY OF THE INVENTION

An object of the present invention is to maximize the stall torque output of a torque transmitting apparatus having a multi-stage torque converter while at the same time smoothing torque-drop through mid-range r.p.m.

Another object is to enable a stepless speed-change power transmission to be suitable for use in heavy duty vehicles.

Still another object of the present invention is to rid an automatic transmission of jolting at speed-changing stages and to simplify its structure.

A vehicle torque transmission apparatus incorporating a multi-stage torque converter according to an aspect of the present invention includes a multi-stage torque converter, a main transmission and a stepless speed-change transmission.

The multi-stage torque converter, connectable to the corresponding section of an engine, employs separate stators. The main transmission is connectable to an output member of the multi-stage torque converter. The stepless speed-change transmission is connected to one of the stators and to the main transmission such that the output torque of the stator is added to the output torque of the main transmission.

Thus, the output torque of the stepless speed-change transmission is in effect added to the output torque of the main transmission. Consequently, wherein a high reduction ratio is established for the lower r.p.m. range of the stepless speed-change transmission, the output torque of the apparatus is maximized; and wherein a comparatively low reduction ratio is set up through mid-range r.p.m., reduced torque-drop is effected. Moreover, the apparatus is advantageous for use in heavy-duty vehicles in which a multiple speed-changing capability is desired, since during speed-changing stages there is no jolting.

If the apparatus is employed in the automatic transmission system of a passenger car, transmission speed is changeable automatically by the stepless speed-change transmission working in conjunction with the multi-stage torque converter, and thus the automatic transmission itself can be simplified.

The foregoing and other objects, aspects and advantages of the present invention will become more apparent from the following detailed description.

DESCRIPTION OF THE PREFERRED EMBODIMENT

Figure 1:
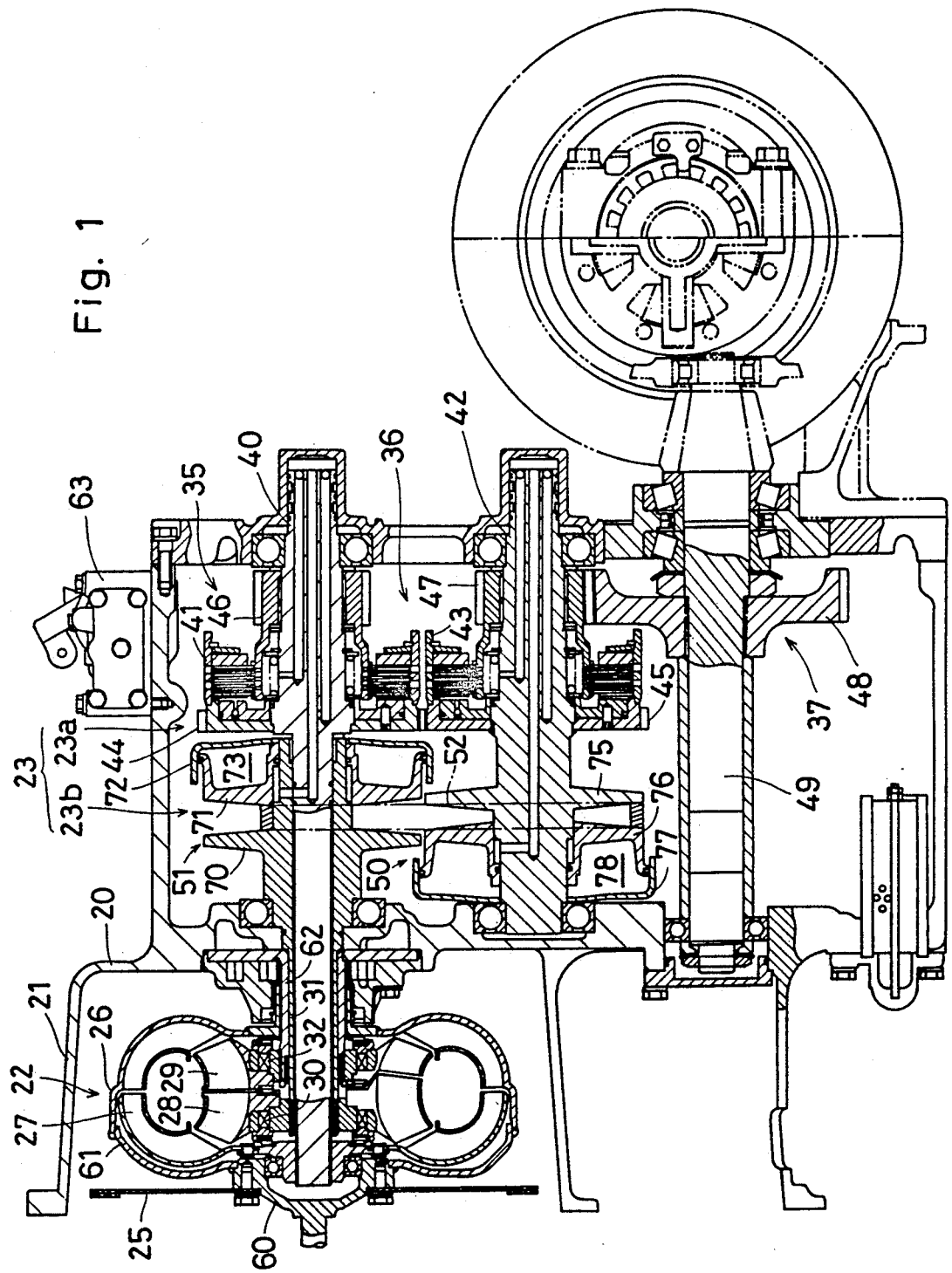
FIG. 1 is a projection of a non-planar section of a torque transmission apparatus according to an embodiment of the present invention.
Figure 2:
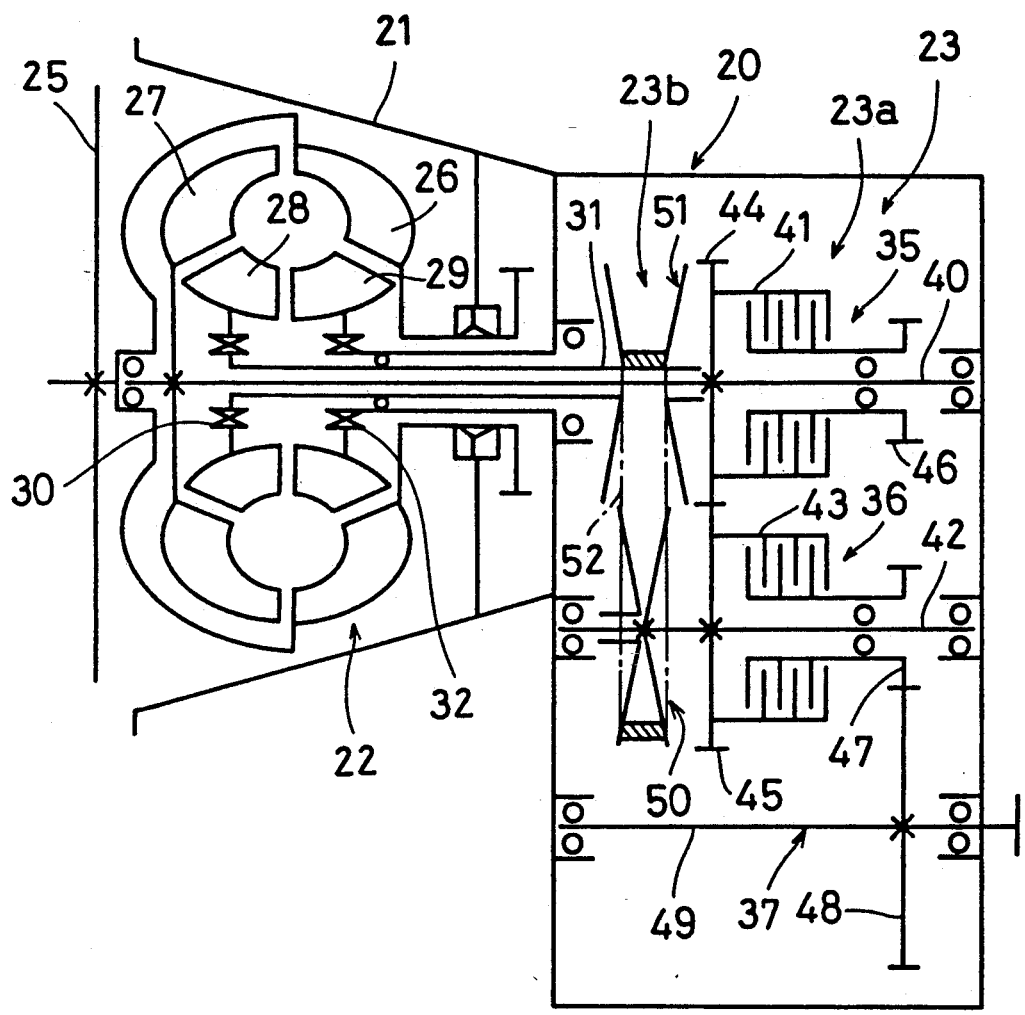
FIG. 2 is a schematic sectional view of the apparatus power train.

The torque transmission apparatus shown in FIGS. 1 and 2 comprises multi-stage torque converter 22 disposed within a surrounding front flange 21 of a casting 20, and a transmission assembly 23 housed within the casing 20.

The multi-stage torque converter 22 is attached through a flexible plate 25 to the flywheel of an engine. A hub flange 60 is fixed to the radially inward margin of the flexible plate 25. A front cover 61 is fixed to the radially outer portion of the hub flange 60. The front cover 61 is welded to an impeller 26 along its circumferentially extending rim. A turbine 27 is located opposite to and is hydraulically coupled with the impeller 26. A reversing stator 28 and a fixed stator 29 are disposed in a region between and radially inward of the impeller 26 and the turbine 27. The reversing stator 28 is connected through a one-way clutch 30 to a stator sleeve-shaft 31. The fixed stator 29 is connected through a one-way clutch 32 and a stationary sleeve 62 to the casing 20. The impeller 26, the turbine 27 and the stators 28 and 29 each have a plurality of blades.

The transmission assembly 23 comprises a reduction (main transmission) and a stepless speed-change transmission 23b.

The main gearing 23a is composed principally of a forward clutch 35, a reverse clutch 36 and an output mechanism 37. The forward clutch 35 includes a turbine shaft 40 extending through the center of the multi-stage torque converter 22, and a multi-disc clutch pack 41 fixed to the turbine shaft 40. The turbine shaft 40 is rotatably supported on bearings in the casing 20, and its front end is engaged by means of a spline, for example, with the turbine 27.

The reverse clutch 36 includes a countershaft 42 and a reverse multi-disc clutch pack 43 fixed to the countershaft 42. The countershaft 42 is rotatably supported on bearings in the casing 20. The forward and reverse multi-disc clutch packs 41 and 43 include respective clutch gears 44 and 45 in mutual engagement. The clutches 35 and 36 include respective pinions 46 and 47 which engage an output gear 48 of the output mechanism 37. The output gear 48 is fixed to an output shaft 49.

The clutch packs 41/43 of the transmission assembly 23 are controlled by a hydraulic control valve 63 mounted on the outer surface of the casing 20.

The stepless speed-change transmission 23b principally comprises an input pulley device 51, an output pulley device 50 and a belt wrapped around them, connecting the pulley devices 50 and 51 in open belting.

The input pulley device 51 is formed onto the rear end of the stator sleeve-shaft 31 and is rotatable relative to the turbine shaft 40. The input pulley device 51 is composed of a fixed pulley 70 which is axially immobile, and a slidable pulley 71, which in sliding either approaches the fixed pulley 70 or retreats from it. The fixed pulley 70 is integral with the stator sleeve-shaft 31 and is rotatably supported on the turbine shaft 40. The central portion of the fixed pulley 70 extends into the slidable pulley 71, so as to retain it slidably.

A cover 72 is disposed over the rear and on a brim of the slidable pulley 71, thus defining a chamber 73 therebetween. When hydraulic fluid enters the chamber 73 through ports of the turbine shaft 40 and the fixed pulley 70 extension, the slidable pulley 71 is driven toward the fixed pulley 70. On the other hand, when the hydraulic fluid recedes, the slidable pulley 71 retreats from the fixed pulley 70 by agency of a return spring (not shown).

The output pulley device 50 consists of a fixed pulley 75 which is axially immobile, and a slidable pulley 76 slidable either to approach or retreat from the fixed pulley 75. The fixed pulley 75 is integral with the counter-shaft 42. The axially slidable pulley 76 is retained on the counter shaft 42. A cover 77 is disposed over the front and on a brim of the slidable pulley 76, thus defining a chamber 78 therebetween. When hydraulic fluid enters the chamber 78 through a port of the counter-shaft 42, the slidable pulley 76 is driven toward the fixed pulley 75. Contrariwise, when the hydraulic fluid recedes, the slidable pulley 76 retreats from the fixed pulley 75 by agency of a return spring (not shown).

Thus the stator sleeve-shaft 31 and the countershaft 42 rotate in the same direction, and the reduction ratio of the stepless speed-change transmission 23b is continuously variable by means of the movement of the slidable pulleys 71 and 76.

Figure 3:
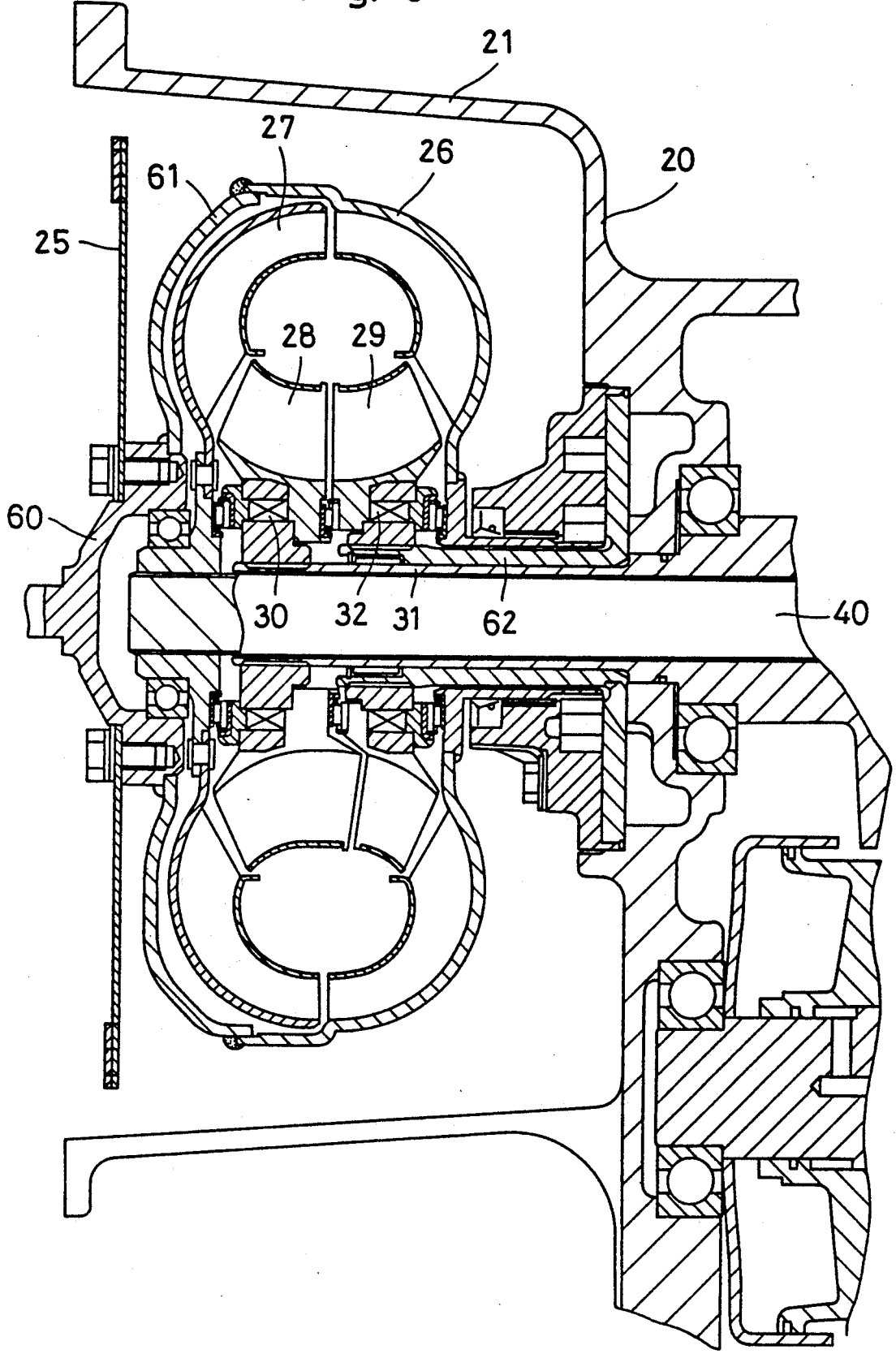
FIG. 3 is an enlarged partial view of FIG. 1.

Operation of the transmission is described in the following, wherein reference is made to FIG. 3.

When the impeller 26 coupled to the flexible plate 25 rotates, the velocity energy is transmitted to hydraulic fluid therein, which in turn drives the turbine 27 to rotate. Consequently, torque is developed in the turbine 27. The hydraulic fluid flows from the turbine 27 into the reversing stator 28 and the fixed stator 29, wherein the fluid flow direction is changed to the direction of the rotation of the impeller 26. The power of the hydraulic fluid flowing into the reversing stator 28 acts upon its blades, therein developing torque.

In the transmission of the present invention, primary torque is through the turbine 27 coupled to the turbine shaft 40, and then in forward output, through the clutch pack 41 and the pinion 46 to the output gear 48 and the output shaft 49. In reverse output, torque from the turbine shaft 40 is transmitted through the clutch pack 43 to the output gear 48 and the output shaft 49, via the engagement of the clutch gears 44 and 45 in the main gearing 23a. Additionally, secondary torque transmission is through the reversing stator 28, in a direction reverse to the turbine 27 rotational torque direction (wherein the speed ratio of the stator relative to the turbine is initially high), via the sleeve shaft 31 to the stepless speed-change transmission 23a, and therein to the countershaft 42 and clutch gear 45. The torque driving the gear 45 is in turn transmitted to the clutch gear 44, driving it in reverse, in the rotational direction opposite to that of the stator 28 direction, coinciding with the turbine shaft 40 rotational direction. The torque in the reversing stator 28 is thus added in the main gearing 23a to turbine 27 torque, in output to the output mechanism 37.

The hydraulic fluid from the reversing stator 28 flows into the fixed stator 29, and the direction of its rotation is changed to coincide with that of the impeller 26.

When the r.p.m. of the turbine 27 attain a certain point (i.e., a coupling point), the fluid inlet angle against the reversing stator 28 changes. As a result, the reversing stator 28 starts to rotate, accorded by the one-way clutch 30. By these means the reduction ratio of the stepless speed-change transmission 23b is gradually reduced prior to onset of the stator rotation, whereupon a fixed reduction ratio remains constant throughout the remaining r.p.m. range.

Figure 4:
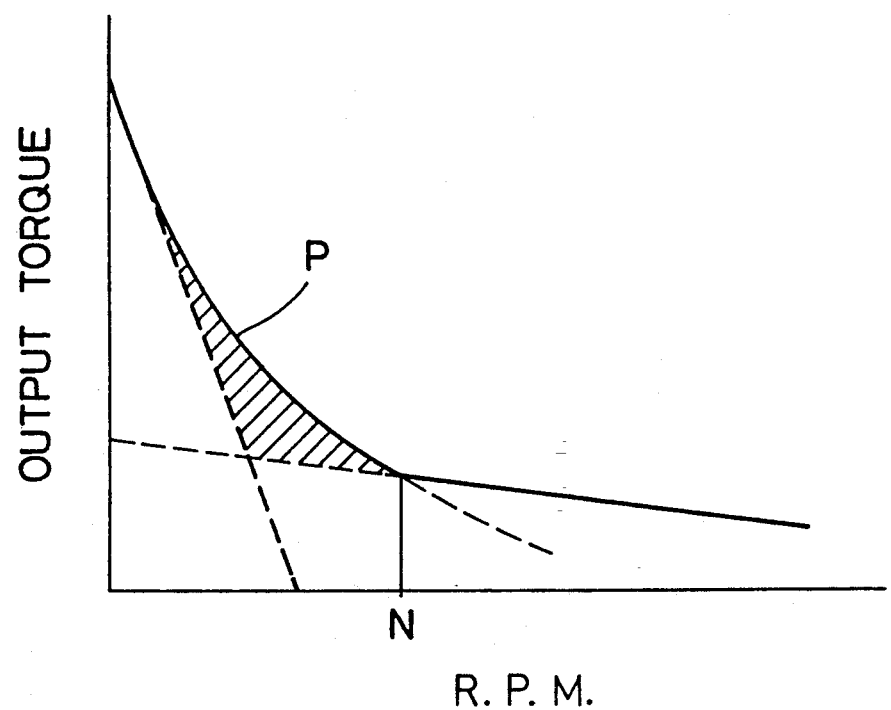
FIG. 4 is a graph illustrating r.p.m. versus output torque characteristics of the apparatus.
Figure 5:
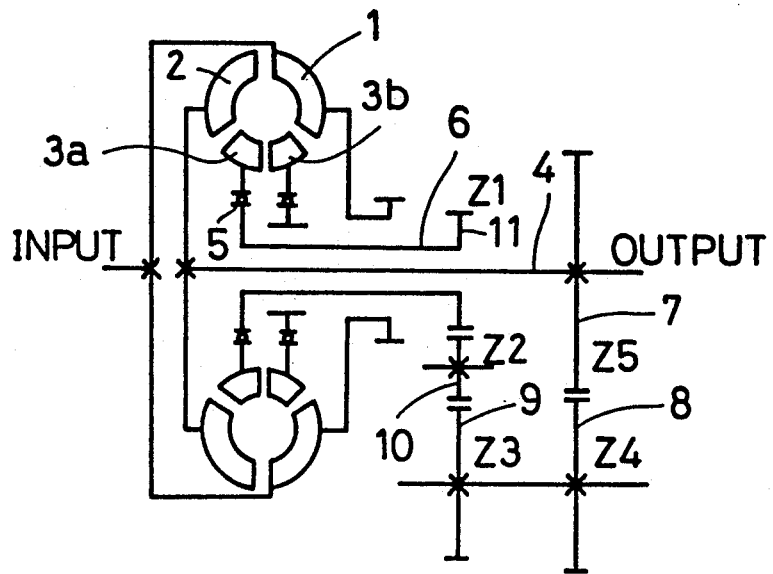
FIG. 5 is a schematic sectional view of a conventional torque transmitting apparatus.
Figure 6:
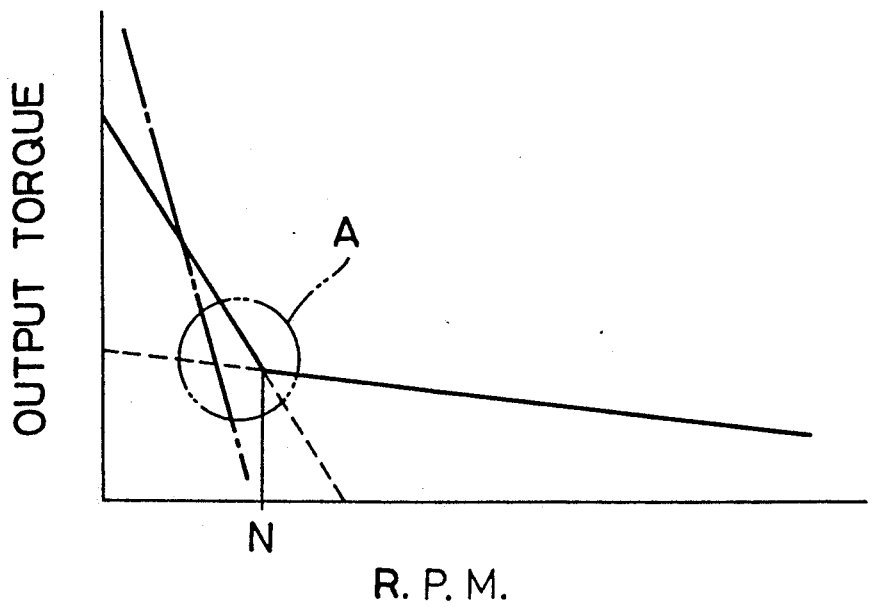
FIG. 6 is a graph illustrating r.p.m. versus output torque characteristics of a conventional transmission.

In the invention as thus embodied, because the reduction ratio of the transmission 23b is gradually changeable, the output torque characteristics correspond to the curve P as illustrated by FIG. 4, to the coupling point N, at which the reversing stator 28 starts to rotate. Consequently, the output torque is maximal through the lower r.p.m. range, and torque-drop in the output torque through the middle r.p.m. range is reduced. The output torque characteristics through the higher r.p.m. range are the same as is conventional.

Moreover, wherein the apparatus is utilized in the automatic transmission systems of passenger cars, the transmission speed is shifted automatically by the stepless speed-change transmission working in conjunction with the multi-stage torque converter, thus providing a simplified transmission.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A torque transmission apparatus operating in connection with a motor vehicle engine, comprising:
    a multi-stage torque converter comprising an impeller wheel which is connected to said motor vehicle engine, a turbine wheel hydraulically coupled to said impeller, and separate stators hydraulically coupled to said turbine wheel;
    a main transmission having a turbine shaft connected to said turbine wheel, a countershaft in geared engagement with said turbine shaft, and an output shaft selectively coupled to either of said turbine shaft or countershaft; and
    a stepless speed-change transmission connected to one of said stators and to said countershaft of said main transmission such that torque developed by said stator is added through said countershaft to torque of said turbine shaft of said main transmission.

2. A torque transmission apparatus according to claim 1, wherein said separate stators of said multi-stage torque converter comprising a fixed stator and a reversing stator disposed in a region radially inward of said impeller and said turbine wheels.

3. A torque transmission apparatus according to claim 2, further comprising:
    a casing housing said torque transmission apparatus;
    a stationary shaft fixed to said casing and coupled to said fixed stator;
    a first one-way clutch disposed between said fixed stator and said stationary shaft; and
    a second one-way clutch disposed between said reversing stator and said stepless speed-change transmission.

4. A torque transmission apparatus according to claim 3, wherein:
    said countershaft is disposed in parallel with said turbine shaft, said countershaft rotating in a direction opposite to a direction of rotation of said turbine shaft;
    said output shaft is disposed in parallel with said turbine shaft and said countershaft, said output shaft selectively delivering output torque from either of said turbine shaft or counter shaft; and
    said stepless speed-change transmission includes a stator shaft connected through said second one-way clutch to said reversing stator, an input pulley device mounted on said stator shaft, an output pulley device mounted on said countershaft, and a belt wrapped around said input and output pulley devices such that said stator shaft and said countershaft rotate in the same direction.

5. A torque transmission apparatus according to claim 4, wherein:
    said input pulley device comprises a first fixed pulley, fixed to said stator shaft so as not to be axially slidable, and a first slidable pulley which is slidable either to approach or retreat from said first fixed pulley;
    said output pulley device comprises a second fixed pulley, fixed to said countershaft so as not to be axially slidable, and a second slidable pulley which is slidable either to approach or retreat from said second fixed pulley.

6. A torque transmission apparatus according to claim 5, wherein said first fixed pulley is integrally formed with said stator shaft, and said second fixed pulley is integrally formed with said countershaft.

7. A torque transmission apparatus according to claim 4, wherein said main transmission includes a first clutch gear fixed to said turbine shaft; a first pinion gear rotatably supported on said turbine shaft; a first multi-disc clutch pack disposed axially between said first clutch gear and said first pinion gear and fixed to said turbine shaft; a second clutch gear fixed to said countershaft; a second pinion gear rotatably supported on said countershaft; a second multi-disc clutch pack disposed axially between said second clutch gear and said second pinion gear and fixed to said countershaft; and an output gear connected to said output shaft and engaging said first and second pinion gears; wherein
    said geared engagement of said turbine shaft and said countershaft is through meshing of said first and second clutch gears.

8. A torque transmission apparatus according to claim 7, wherein said first and second multi-disc clutch packs are hydraulic clutches.

9. A torque transmission apparatus according to claim 2, further comprising:
    an annular flexible plate fixed to said member in said engine section;
    a hub flange fixed to a radially inward margin of said flexible plate; and
    an annular front cover, of which a radially inward margin is fixed to said flange, and of which a radially outer rim is fixed to said impeller wheel.

* * * * *